(12) United States Patent
Davids et al.

(10) Patent No.: US 6,813,431 B2
(45) Date of Patent: Nov. 2, 2004

(54) INTEGRATED PHOTODEVICE AND WAVEGUIDE

(75) Inventors: Paul Davids, Portland, OR (US); Bruce A. Block, Portland, OR (US); Miriam R. Reshotko, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/085,474

(22) Filed: Feb. 26, 2002

(65) Prior Publication Data

US 2003/0161571 A1 Aug. 28, 2003

(51) Int. Cl.[7] .................................................. G02B 6/10
(52) U.S. Cl. ........................ 385/129; 385/14; 385/27; 385/39; 385/130; 385/131; 385/140; 257/436
(58) Field of Search ............................. 385/14, 27, 39, 385/129–131, 140, 15, 49; 257/436

(56) References Cited

U.S. PATENT DOCUMENTS

| | | | | |
|---|---|---|---|---|
| 4,747,649 A | * | 5/1988 | Heinen et al. | 385/14 |
| 4,772,787 A | * | 9/1988 | Trommer | 250/227.29 |
| 4,969,712 A | * | 11/1990 | Westwood et al. | 385/14 |
| 5,347,601 A | * | 9/1994 | Ade et al. | 385/3 |
| 5,391,869 A | | 2/1995 | Ade et al. | 250/227.24 |
| 5,412,679 A | * | 5/1995 | Hung et al. | 372/45 |
| 5,416,870 A | * | 5/1995 | Chun et al. | 385/88 |
| 5,832,019 A | * | 11/1998 | Paoli et al. | 372/46 |
| 5,883,988 A | * | 3/1999 | Yamamoto et al. | 385/14 |
| 6,154,582 A | * | 11/2000 | Bazylenko et al. | 385/14 |
| 6,160,273 A | * | 12/2000 | Fork et al. | 257/98 |
| 6,323,480 B1 | * | 11/2001 | Tran et al. | 250/214.1 |
| 6,430,325 B1 | * | 8/2002 | Shimoda | 385/14 |
| 6,473,551 B2 | * | 10/2002 | Norwood et al. | 385/130 |
| 6,507,681 B1 | * | 1/2003 | Kowalczyk et al. | 385/16 |
| 6,611,635 B1 | * | 8/2003 | Yoshimura et al. | 385/14 |
| 6,661,939 B2 | * | 12/2003 | Kaneko et al. | 385/14 |
| 6,690,845 B1 | * | 2/2004 | Yoshimura et al. | 385/14 |
| 2001/0053260 A1 | * | 12/2001 | Takizawa et al. | 385/14 |
| 2002/0015155 A1 | | 2/2002 | Pechstedt et al. | 356/477 |
| 2003/0103542 A1 | * | 6/2003 | Cox et al. | 372/96 |
| 2003/0174926 A1 | * | 9/2003 | Oikawa et al. | 385/14 |

FOREIGN PATENT DOCUMENTS

EP          0 272 384          6/1988          ............ G02B/6/12

OTHER PUBLICATIONS

International Search Report (PCT/US03/03685) mailed Nov. 21, 2003.

* cited by examiner

*Primary Examiner*—Brian Healy
*Assistant Examiner*—Daniel Petkovsek
(74) *Attorney, Agent, or Firm*—Fish & Richardson P.C.

(57) ABSTRACT

A waveguide includes a waveguide core that has a bottom surface and a top surface that defines an angle. The waveguide also includes a cladding layer adjacent to the bottom surface. The cladding layer has a thickness equal to or greater than an evanescent tail of a mode to be transmitted along the wave guide core.

22 Claims, 14 Drawing Sheets

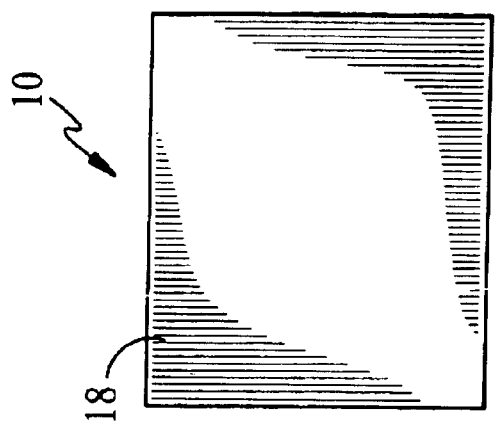
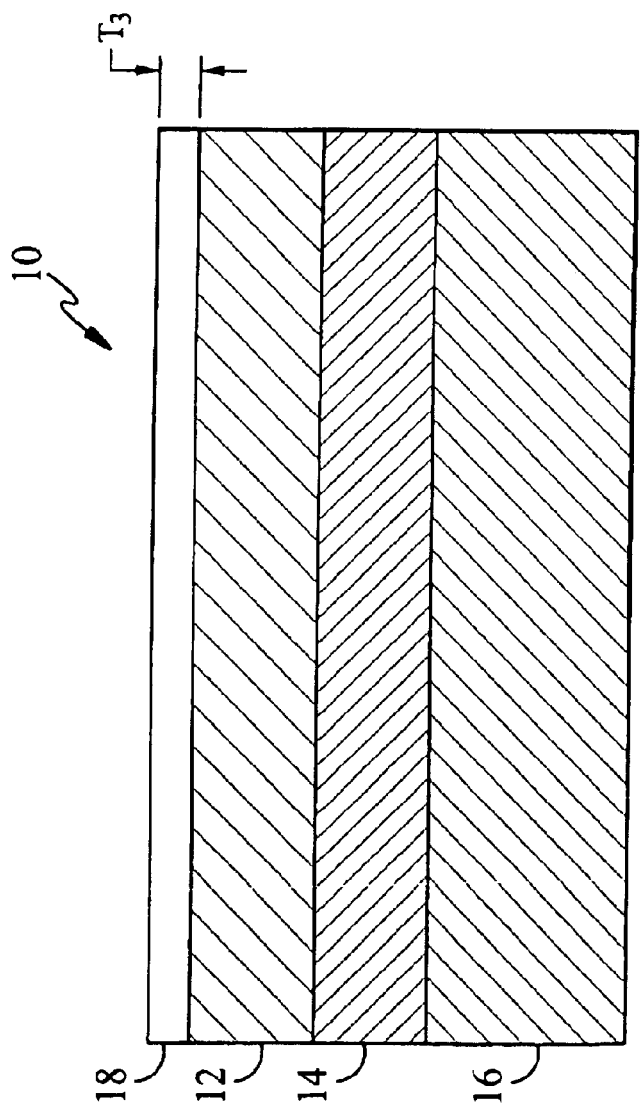
FIG. 2B
FIG. 2A

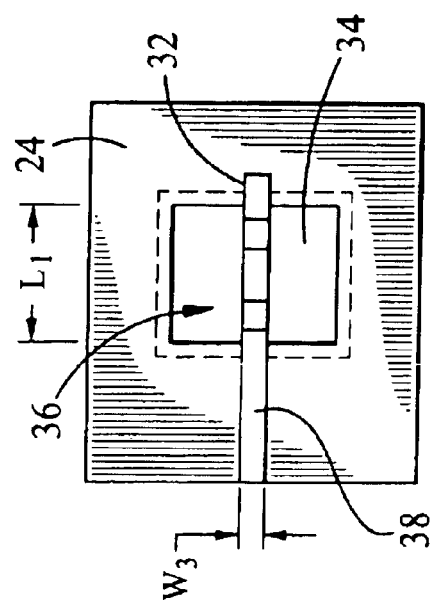
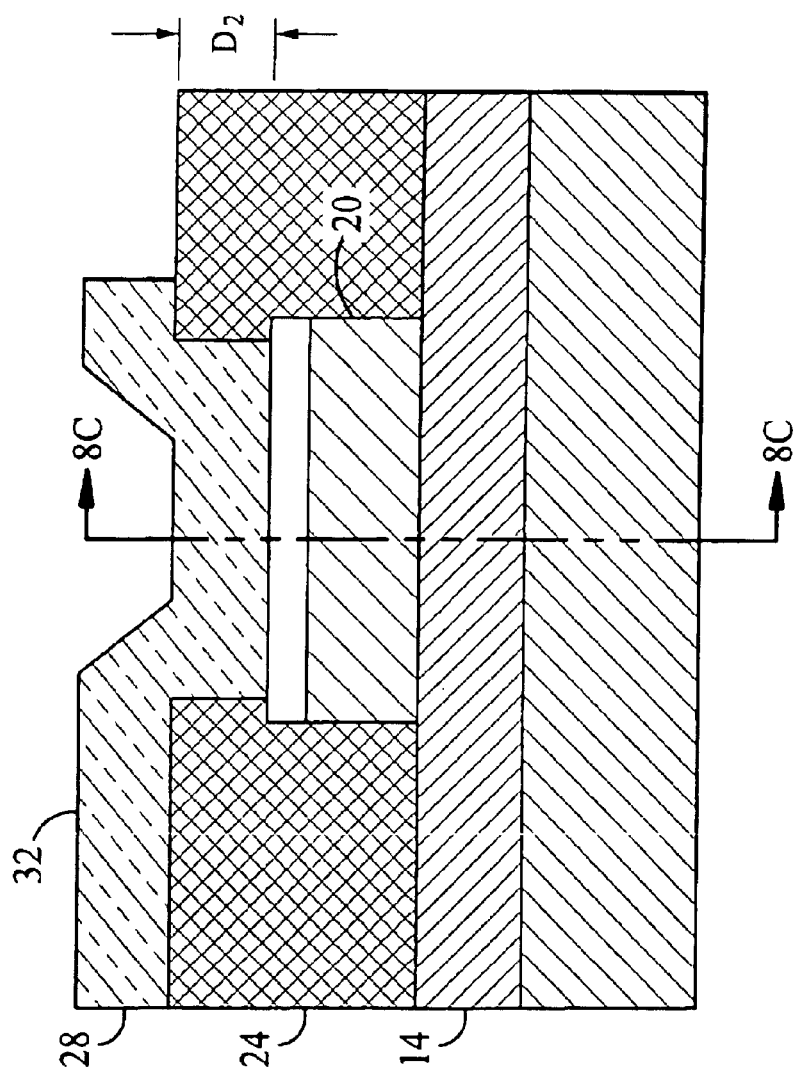
FIG. 8B
FIG. 8A

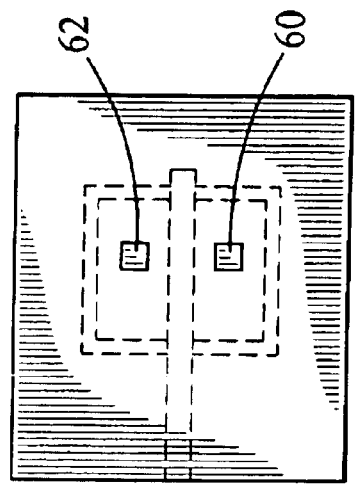
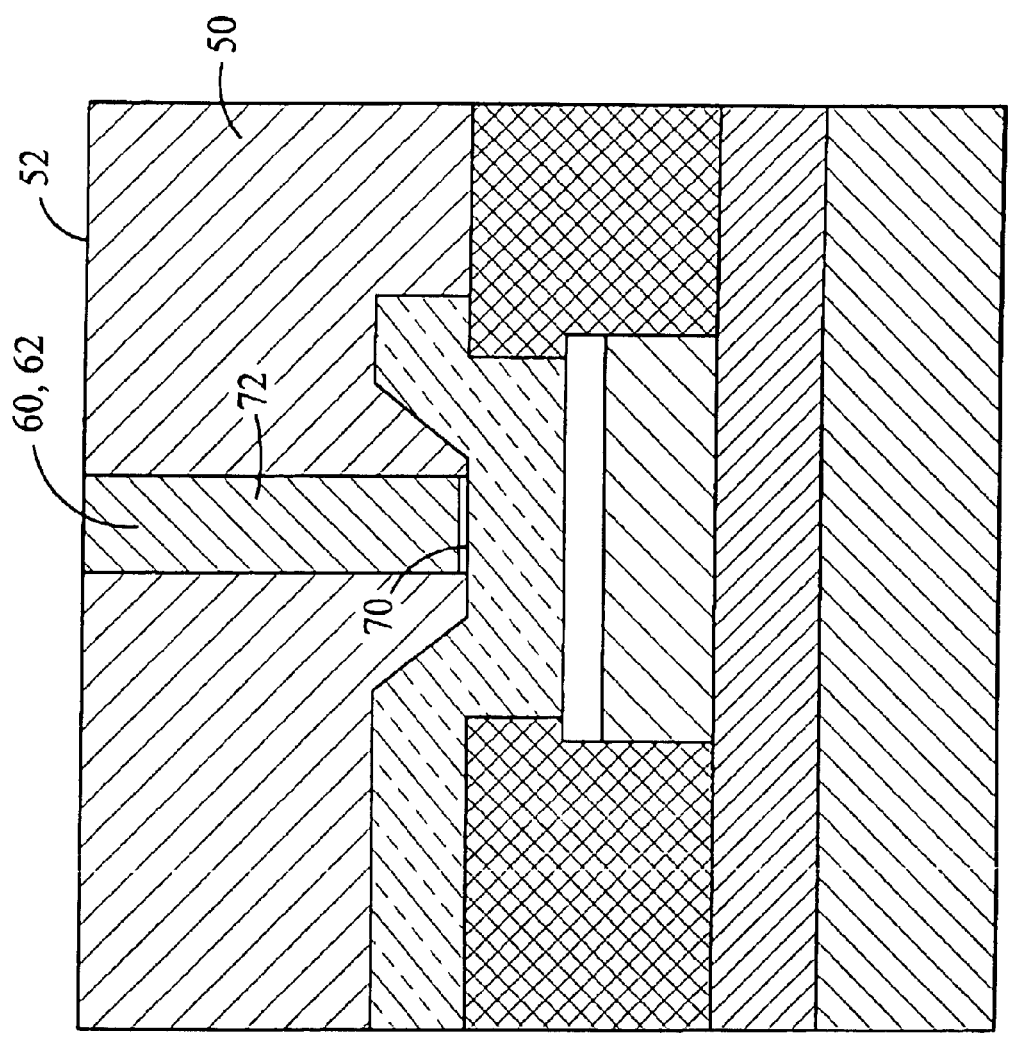
FIG. 11B
FIG. 11A

INTEGRATED PHOTODEVICE AND WAVEGUIDE

TECHNICAL FIELD

This application relates to waveguides integrated with semiconductor devices.

BACKGROUND

Light propagates in straight line paths known as rays. Rays are refracted, reflected, and scattered at material interfaces. In a dielectric waveguide, a high index core is surrounded by a lower index cladding layer, rays are confined in the high index core region by total internal reflection at the core/cladding interface. The reflected rays interfere with each other to form electromagnetic field patterns within the guide. Modes of the guide refer to field patterns that propagate in the core region without dispersion, i.e. changing shape.

For electrical detection of light in a waveguide, the light needs to be absorbed in the detector material and the photogenerated charge must be collected. To improve detection efficiency, the absorbing material is typically placed in contact with the waveguide in a configuration known as evanescent coupling. The detector coupling efficiency can be improved by including an intermediate matching layer between the waveguide core and the absorbing detector material. This configuration still suffers from scattering loss from the detector material and inefficient coupling due to mode repulsion and guiding in the matching layer.

Performance limits of a photodetector device are given by the gain bandwidth product. A photodetector with high gain will have diminished frequency response or bandwidth, and a fast photodetector will have reduced gain or signal. The speed of a photodectector is limited by the transit time of the slowest carriers across the detector's active region.

DESCRIPTION OF THE DRAWINGS

FIGS. 1A, 2A, 3A, 4A, 5A, 6A, 7A, 8A, 8C, 9A, 10A, and 11A are cross-sectional views of a phototransistor and waveguide at various stages of fabrication;

FIGS. 1B, 2B, 3B, 4B, 5B, 6B, 7B, 8B, 9B, 10B, and 11B are top views of a phototransistor and waveguide at various stages of fabrication;

DESCRIPTION

An integrated system of a phototransistor or photodiode coupled with a waveguide provides a relatively fast, compact integrated photodetector with gain. The phototransistor or photodiode can serve as an element in a logic circuit, switched by light. A high index waveguide integrated with a phototransistor or photodiode efficiently couples light into a lossy detector material. The light is absorbed in the detector material, which confines the electron hole pairs to a small region within a base of the phototransistor or intrinsic region of a photodiode. This configuration reduces the area of the base or intrinsic region and allows for faster switching frequency. Furthermore, it allows the emitter collector current to be amplified.

Isolating a detector active material from incident evanescent mode tail, i.e., a portion of a light mode not confined to the waveguide core, with a cladding material having a low index of refraction reduces losses due to reflection and diffraction at the input to the detector region. Further, a dielectric beveled mirror steers the light mode guided through the waveguide core into the detector material, increasing the coupling efficiency into the high index, high loss detector material by increasing the angle of incidence on the detector material.

Figure 1B:
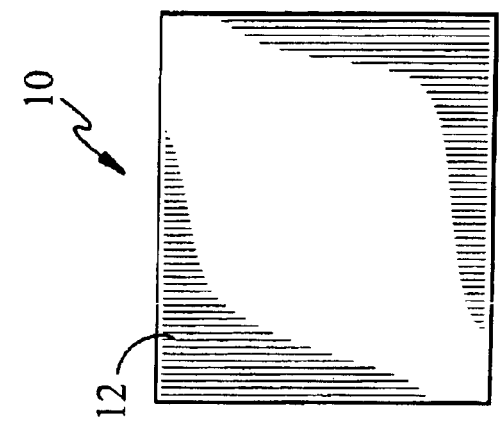
Figure 1A:
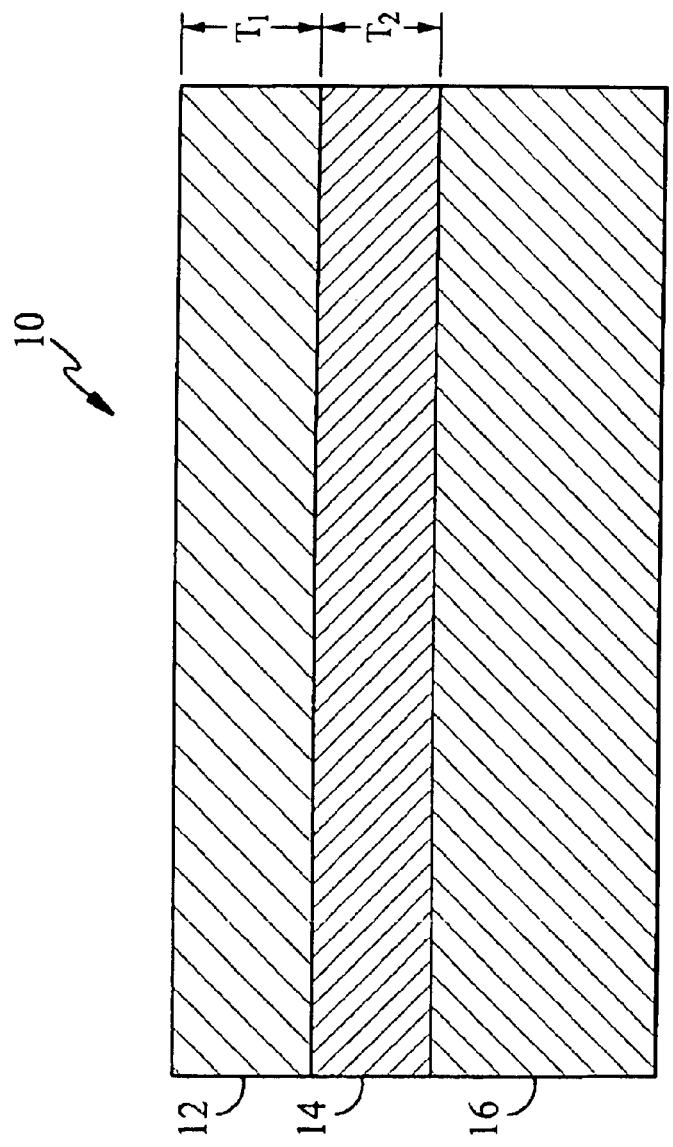

Referring to the cross-sectional view illustrated in FIG. 1A, a silicon-on-insulator (SOI) substrate 10 has a thin silicon layer 12 on its top surface, disposed over a buried silicon dioxide layer 14. Silicon layer 12 and buried silicon dioxide layer 14 are provided on a wafer 16, e.g., an 8-inch silicon wafer. Thin silicon layer 12 has a thickness $T_1$ of, e.g., 0.5 microns ($\mu$m). Buried silicon dioxide layer 14 has a thickness $T_2$ of, e.g., 0.3 $\mu$m. Thin silicon layer 12 is the top layer of SOI substrate 10, as shown in the top view of FIG. 1B.

Referring to FIG. 2A, a cross-sectional view, and to FIG. 2B, a top view of SOI substrate 10, an attenuating layer 18 is deposited over silicon layer 12. Attenuating layer 18 is a lossy material, i.e., it is capable of absorbing light. Attenuating layer 18 has an index of refraction higher than that of silicon. Further, the material forming attenuating layer 18 is compatible with silicon, so that attenuating layer 18 will not delaminate from silicon layer 12. Attenuating layer 18 is, for example, a germanium layer. Attenuating layer 18 is deposited by a deposition method such as chemical vapor deposition (CVD). In the case of a germanium attenuating layer 18, the deposition can be performed with germane gas and a hydrogen carrier at 600° C. The germanium can be deposited in a CVD system such as the Epsilon® manufactured by ASM International or the Epi xP Centura® manufactured by Applied Materials. Attenuating layer 18 has a thickness $T_3$ of, e.g., 0.1 $\mu$m.

Figure 3B:
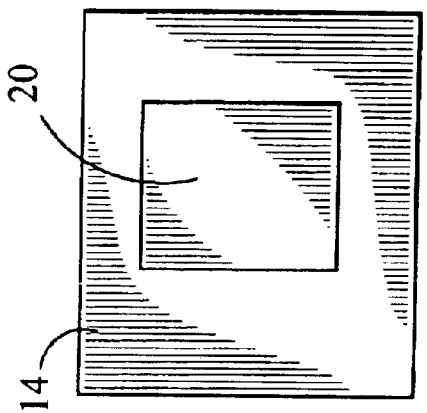
Figure 3A:
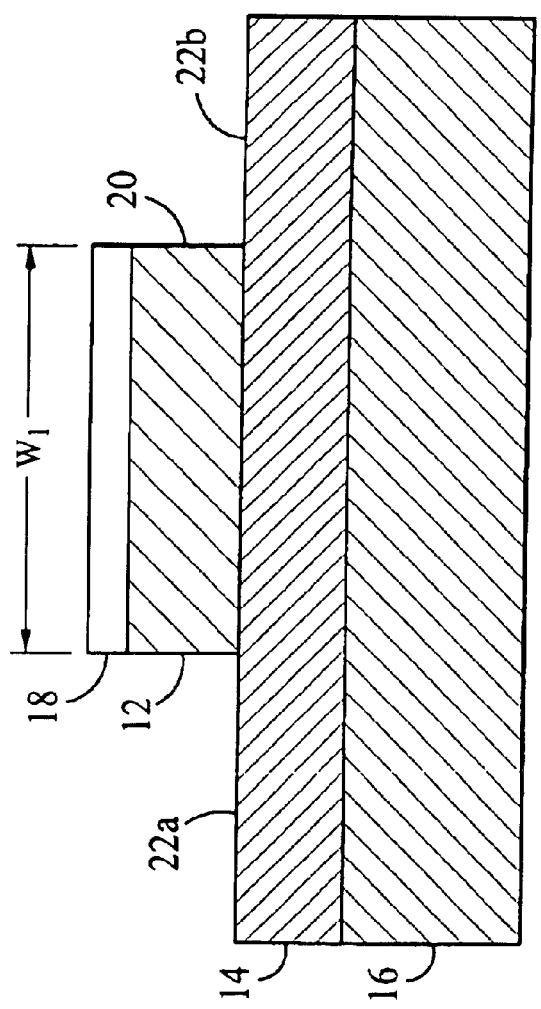

Referring also to the cross-sectional view of FIG. 3A and top view of FIG. 3B, a photoresist pattern (not shown) is defined on attenuating layer 18. Portions of attenuating layer 18 not covered by the photoresist are removed by dry etching, such as by a chlorine/hydrogen bromide chemistry. Removal of portions of attenuating layer 18 exposes portions of the underlying thin silicon layer 12. Subsequently, exposed portions of underlying thin silicon layer 12 are removed by dry etching by using a chlorine/hydrogen bromide chemistry, to expose portions 22a, 22b of buried oxide layer 14. Etching back to buried oxide layer 14 helps to electrically and optically isolate the phototransistor to be formed with its base below attenuating layer 18. After etching of attenuating layer 18, a mesa region 20 is defined by a portion of attenuating layer 18 and silicon layer 12 that is not removed by the etching. Mesa region 20 has a width $W_1$ of, e.g., 6 $\mu$m. The minimum width $W_1$ is determined by the dimensions of a phototransistor to be built in mesa region 20 (see below).

Figure 4B:
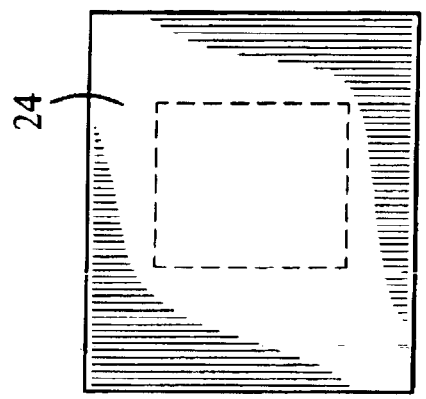
Figure 4A:
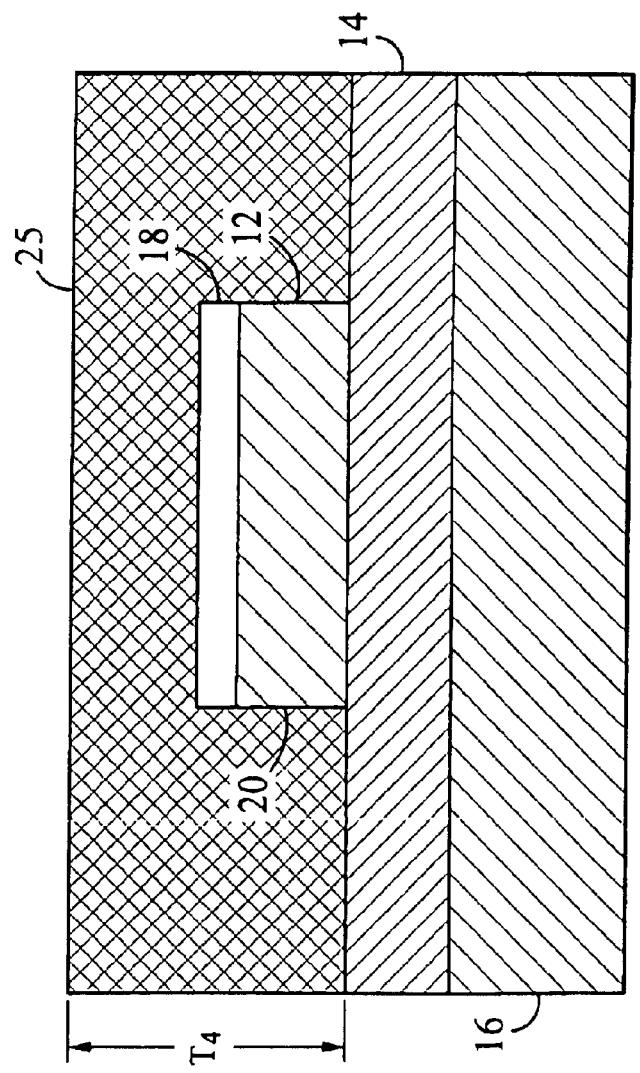

Referring to the cross-sectional view illustrated in FIG. 4A and top view shown in FIG. 4B, an intermediate cladding layer 24 is deposited over buried oxide layer 14 and mesa region 20. Intermediate cladding layer 24 is, for example, a silicon dioxide layer, deposited by a method such as plasma enhanced chemical vapor deposition (PECVD). As deposited, intermediate cladding layer 24 has a thickness of, for example, 1 $\mu$m, and a relatively low refractive index of, e.g., 1.5. Intermediate cladding layer 24 is planarized by chemical mechanical polishing so that a top surface 25 is substantially flat. After polishing, intermediate cladding layer 24 has a thickness $T_4$ of, for example, 0.85 $\mu$m above buried oxide layer 14. Thickness $T_4$ of intermediate cladding layer 24 is selected so that it is equal to or thicker than an evanescent tail of a mode to be transmitted along a waveguide constructed over intermediate cladding layer 24 (see below). The evanescent tail of a mode is the portion of light rays propagated in a waveguide core that exponentially decay outside the waveguide core.

Figure 5B:
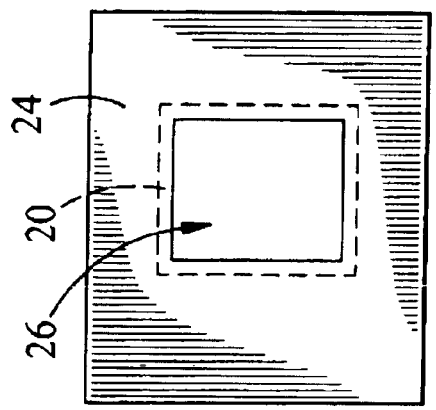
Figure 5A:
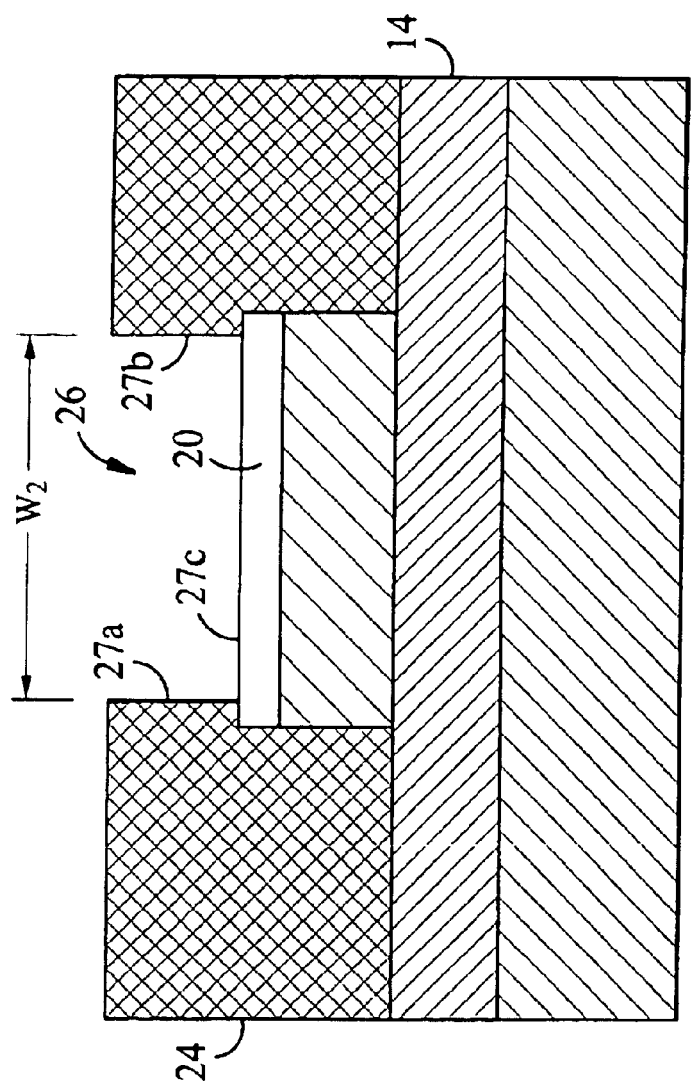

Referring also to the cross-sectional view illustrated in FIG. 5A and the top view illustrated in FIG. 5B, a photoresist layer (not shown) is patterned over intermediate cladding layer 24. The photoresist layer defines an opening over mesa region 20. A portion of intermediate cladding layer 24 exposed by the opening in the photoresist layer is removed over mesa region 20 by dry etching to form a cladding layer window 26. Cladding layer window 26 is defined by a first sidewall 27a and a second sidewall 27b formed by intermediate cladding layer 24 and a top surface 27c of mesa region 20. The dry etching is done with a gas mixture such as trifluoromethane/oxygen ($CHF_3/O_2$). Cladding layer window 26 has a width $W_2$ of, e.g., 5.5 μm. Cladding layer window 26 width $W_2$ is less than mesa region 20 width $W_1$, thereby facilitating photolithographic alignment of cladding layer window 26 over mesa region 20.

Figure 6B:
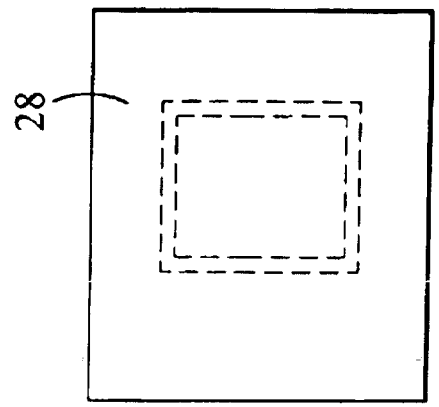
Figure 6A:
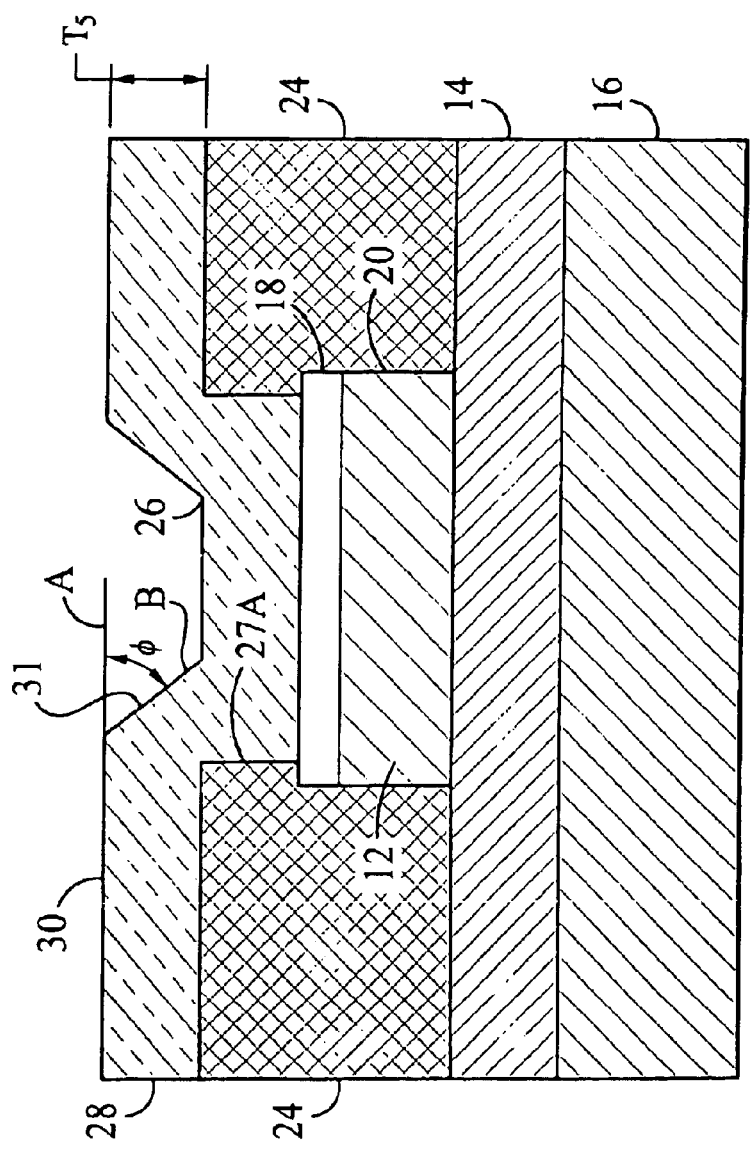

Referring to the cross-sectional view shown in FIG. 6A and the top view shown in FIG. 6B, a waveguide layer 28 is formed over intermediate cladding layer 24. Waveguide layer 28 is, for example, a silicon nitride layer deposited by, e.g., PECVD using precursors of silane and nitrogen. Waveguide layer 28 has a relatively high index of refraction, higher than that of intermediate cladding layer 24. Waveguide layer 28, therefore, has an index of refraction greater than 1.5, and, in some embodiments, greater than 1.9. In use, the high contrast between waveguide layer's 28 relatively high index of refraction and intermediate cladding layer's 24 relatively low index of refraction helps to confine light transmitted through waveguide layer 28. Further, waveguide layer 28 is optically transparent in the wavelength region at which the completed device is to operate, for example, optically transparent for light having a wavelength of 850 nm.

Waveguide layer 28 covers intermediate cladding layer 24 and mesa region 20, and has a thickness $T_5$ above intermediate cladding layer 24 of, e.g., 0.3 μm. A top surface 30 of waveguide layer 28 defines an angle φ, with angle φ extending between a line A in a plane of waveguide top surface 30 over intermediate cladding layer 24 and a line B in a plane of waveguide top surface 30 over first sidewall 27a in cladding layer window 26. The slope of waveguide top surface 30 in cladding layer window 26 defines a beveled mirror 31. Angle φ is selected such that, in use, a mode traveling through waveguide layer 28 undergoes total internal reflection off beveled mirror 31 and is directed into thin silicon layer 12 through attenuating layer 18. A critical angle of incidence $θ_c$ is defined as $$θ_c = \sin^{-1}(n_2/n_1)$$

where $n_1$=refractive index of medium through which light is propagated, e.g., waveguide layer 28 and $n_2$=refractive index of proximate medium, e.g., intermediate cladding layer 24. Angle φ is, for example, 25°. Then, any angle φ greater than 25° would cause total internal reflection and propagated light would be confined to waveguide layer 28.

Figure 7B:
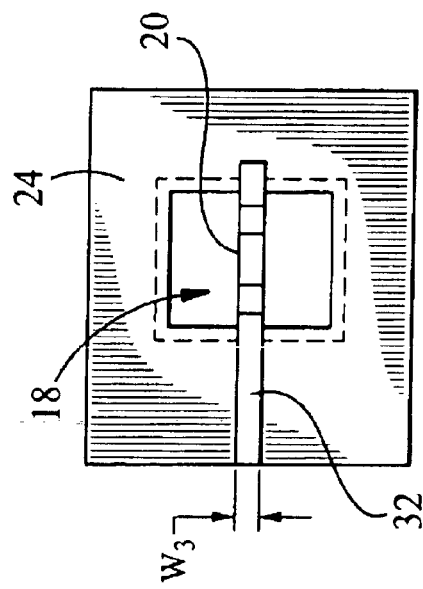
Figure 7A:
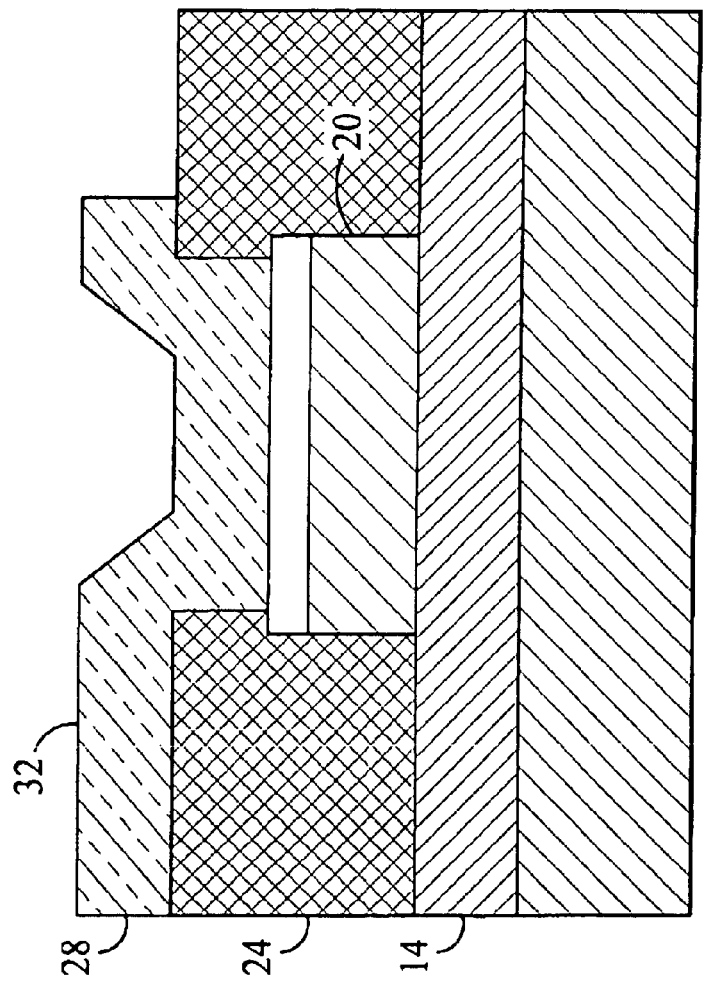

Referring to the cross-sectional view illustrated in FIG. 7A and top view illustrated in FIG. 7B, a photoresist layer (not shown) is deposited and patterned over waveguide layer 28. Portions of waveguide layer 28 not covered by the photoresist are subsequently removed by, for example, a dry etch. In the case where waveguide layer 28 is a silicon nitride layer, the dry etch can be performed with a gas mixture such as difluoromethane/oxygen ($CH_2F_2/O_2$). A portion of waveguide layer 28 covered by photoresist is not etched away, thereby forming a waveguide core 32. Waveguide core 32 has a width $W_3$ of, e.g., 0.3 μm. Waveguide core 32 extends over intermediate cladding layer 24 and is in contact with mesa region 20.

Waveguide core 32 thickness $T_5$ and width $W_3$ are determined by the mode type to be propagated through waveguide layer 28 during use. For single mode propagation, these dimensions need to be below the cutoff for the first mode and above the cutoff for a second mode. Waveguide core thickness $T_5$ and width $W_3$ are considerably smaller than the free-space wavelength of light, having a maximum of about 0.35 μm.

Figure 8C:
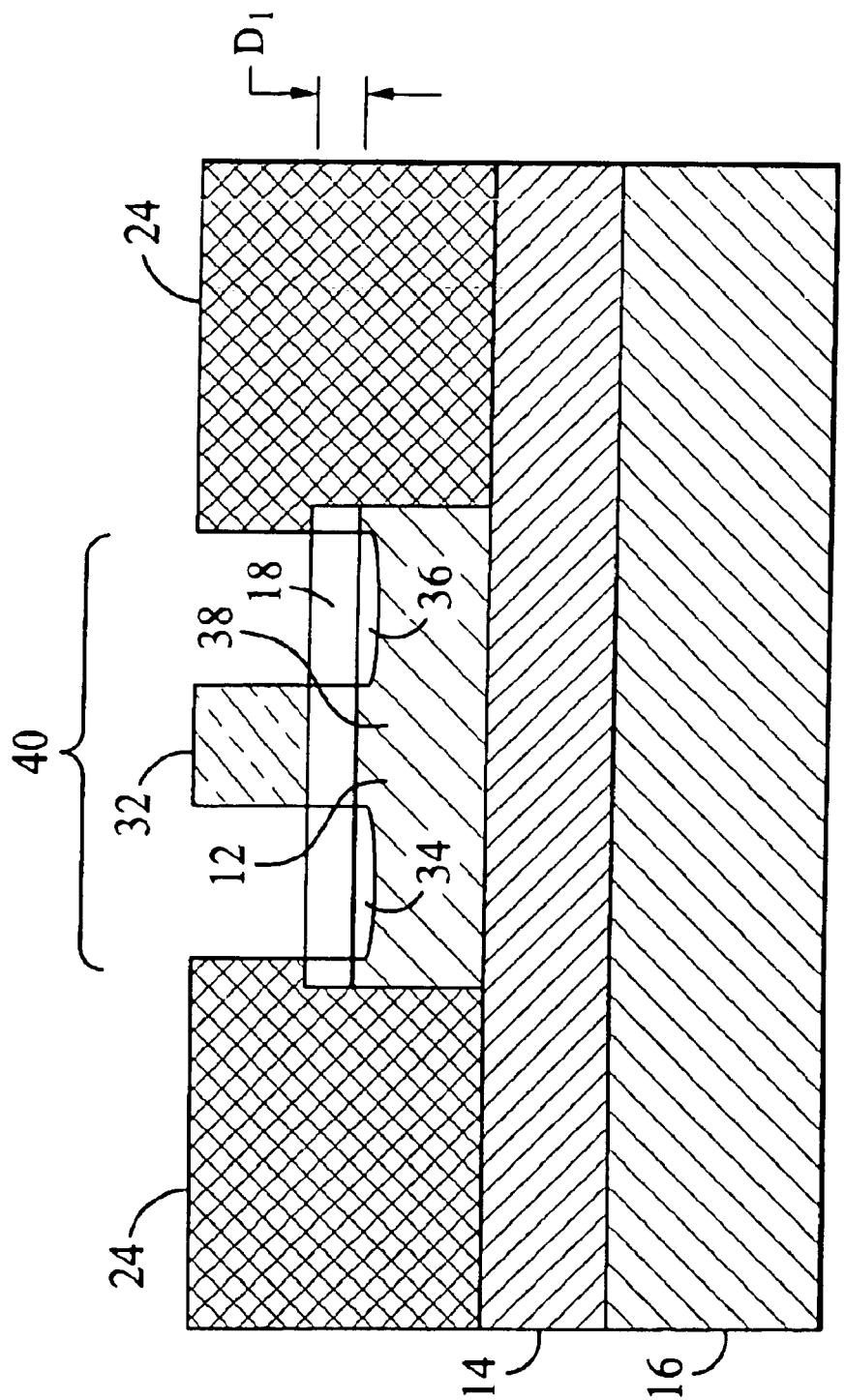

Referring to cross-sectional side view in FIG. 8A, top view in FIG. 8B, and cross-sectional slice view in FIG. 8C, an emitter 34 and a collector 36 are formed in thin silicon layer 12 proximate waveguide core 32. Emitter 34 and collector 36 are formed by an ion implantation by implanting through attenuating layer 18, using waveguide core 32 as a mask. In the case of a p-type thin silicon layer 12, n-type ions are implanted, e.g., phosphorus ions, with a dose of 10E14 atoms/centimeter-squared (atoms/$cm^2$), and an energy of 20 kilo-electron volts (keV), to form emitter 34 and collector 36, each having a junction depth $D_1$ of, e.g., 0.3 μm. A lateral phototransistor 40 is thereby formed, with an n-type emitter 34, a n-type collector 36, and a p-type base 38, with the p-type base 38 defined by thin silicon layer 12. P-type base 38 has a length $L_1$ of, e.g., 5.5 μm.

As noted above in reference to FIGS. 4A and 4B, the thickness $T_4$ of intermediate cladding layer 24 is selected so that intermediate cladding layer 24 is equal to or thicker than an evanescent tail of a mode to be transmitted along waveguide core 32 constructed over intermediate cladding layer 24. Intermediate cladding layer 24 prevents the evanescent tail from reaching attenuating layer 18 made of a lossy attenuating material, and thin silicon layer 12, a lossy detector material. This offset increases the speed of phototransistor 40 by reducing the amount of background noise and making the phototransistor 40 more robust. Hindering the evanescent tail from reaching thin silicon layer 12 reduces the amount of extraneous light reflected from thin silicon layer 12, thereby reducing the amount of light necessary to turn on the transistor, as well as reducing the amount of scattered light, which can affect other transistors.

Waveguide core 32 is offset from mesa region 20 by an offset distance $D_2$. Offset distance $D_2$ is, for example, 0.3 μm. Offset distance $D_2$ reduces reflection and scatter from the attenuating layer 18 and thin silicon layer 12.

Figure 9B:
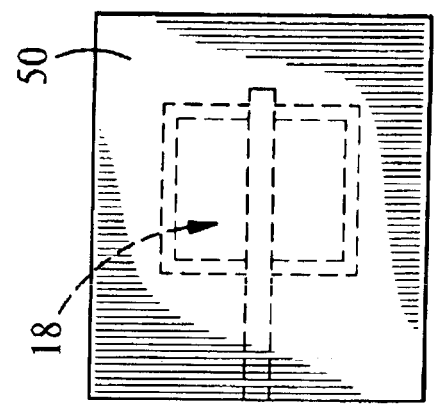
Figure 9A:
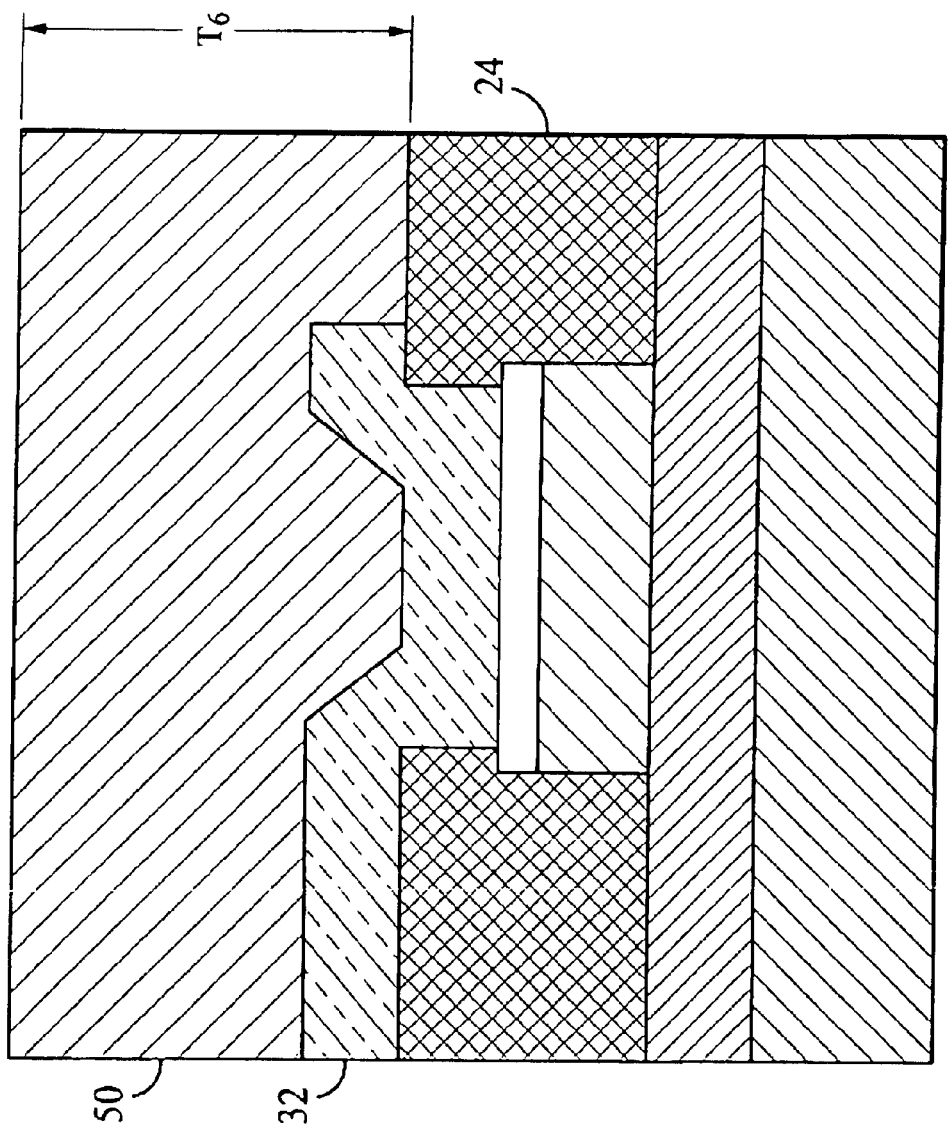

Referring to the cross-sectional view shown in FIG. 9A and the top view shown in FIG. 9B, a top cladding layer 50 is deposited over waveguide 32, intermediate cladding layer 24, and an exposed portion of attenuating layer 18. Top cladding layer 50 is, for example, silicon dioxide deposited by a process such as PECVD. As deposited, top cladding layer 50 has a thickness over intermediate cladding layer 24 of, e.g., 1 μm. Top cladding layer 50 is planarized by chemical mechanical polishing, resulting in a top cladding layer 50 thickness $T_6$ of, for example, 0.85 μm over intermediate cladding layer 24.

Figure 10B:
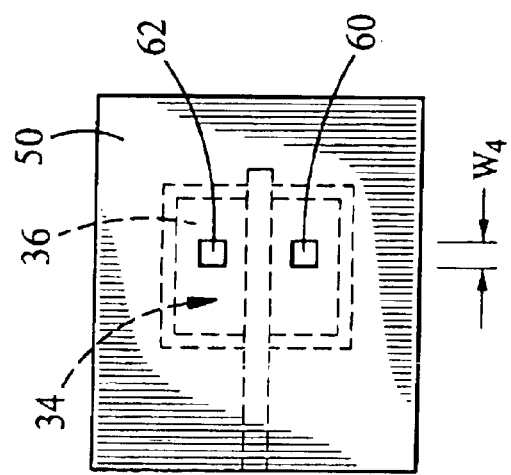
Figure 10A:
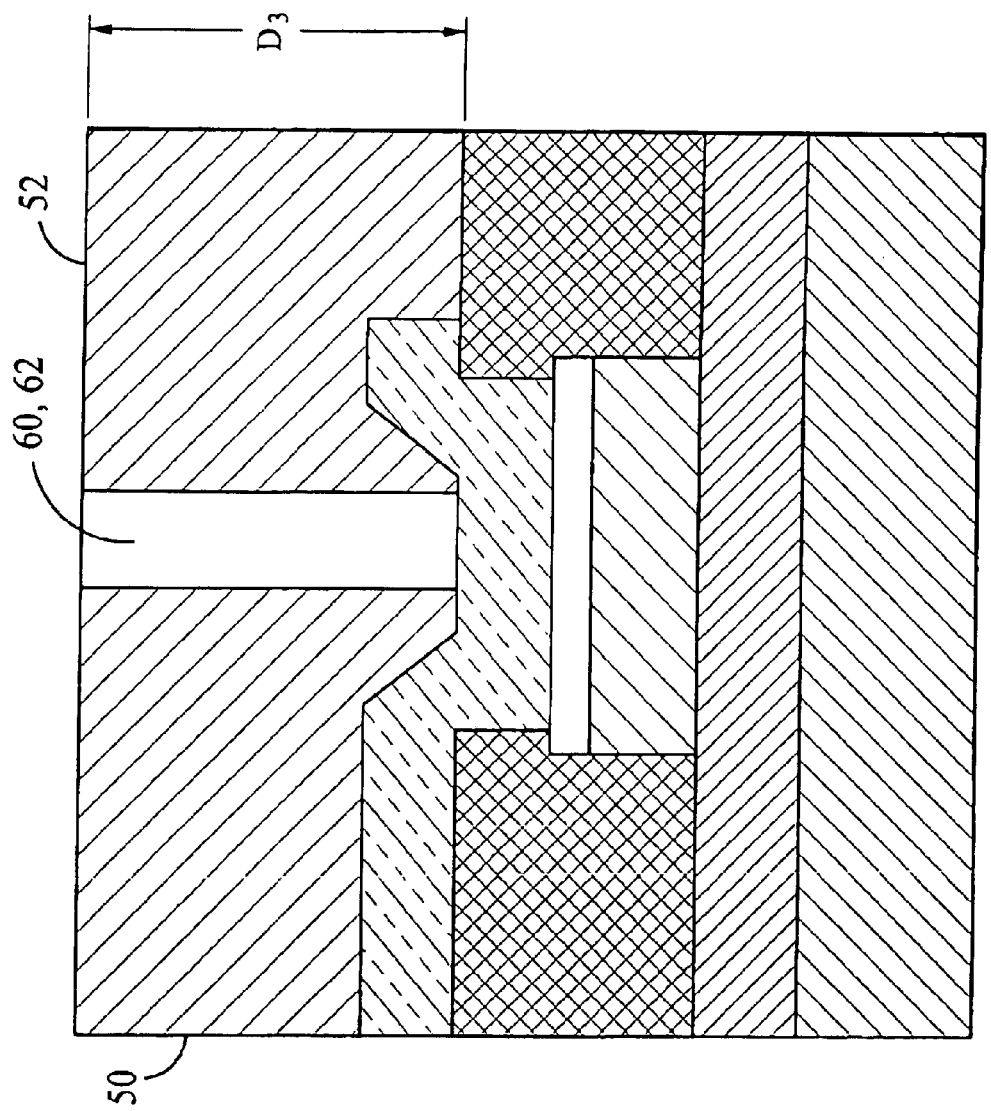

Referring to the cross-sectional view shown in FIG. 10A and the top view shown in FIG. 10B, a photoresist layer (not shown) is deposited and patterned on a top surface 52 of top cladding layer 50. The photoresist layer defines openings over emitter 34 and collector 36. Portions of top cladding layer 50 exposed by the openings defined by the photoresist layer are removed by, for example, dry etching with a $CHF_3/O_2$ plasma. Removal of portions of top cladding layer forms first contact hole 60 over emitter 34 and second contact hole 62 over collector 36. First and second contact holes 60, 62 have a width $W_4$ of, for example, 0.2–0.3 μm, and a depth $D_3$ of, for example, 0.85 μm. After the etch, the photoresist layer is stripped.

Referring to the cross-sectional view illustrated in FIG. 11A and the top view shown in FIG. 11B, an adhesion layer 70 is deposited by CVD in a bottom portion of first contact hole 60 and second contact hole 62. Adhesion layer 70 is a material such as titanium nitride, a material that provides good adhesion and low contact resistance. Subsequently, a metal 72 is deposited over adhesion layer 70 in first and second contact holes 60, 62. Metal 72 is, for example, tungsten deposited by CVD. Excess metal 72 is removed from top surface 52 of top cladding layer 50 by polishing. No metal contact is made to base 38 of phototransistor 40. Base 38, therefore, is left floating.

In use, attenuating layer 18 attenuates a mode propagated by waveguide core 32, and efficiently couples light into thin silicon layer 12 at base 38. Thin silicon layer 12 is a lossy detector, and defines a multimode cavity under mesa region 20. Attenuating layer 18 is also a lossy material that absorbs light well. In the case where attenuating layer 18 is made of germanium, it has an extinction coefficient of about 40 times that of silicon, the extinction coefficient being the fraction of light lost to scattering and absorption. Attenuating layer 18, thereby, contributes to the reduction of the length $L_1$ of the base region 38 needed to absorb and confine light propagated by waveguide core 32.

The efficient coupling of a mode propagating through waveguide core 32 to base 38, therefore, reduces the required length $L_1$ of base 38. The efficiency of the coupling is also improved both by the offset distance $D_2$ of waveguide core 32 from thin silicon layer 12 and by the steering of the mode into base 38 by beveled mirror 31. Beveled mirror 31 confines the mode in the waveguide core 32 and directs the mode towards base 38. The buried oxide layer 14 beneath phototransistor 40 helps to confine light in the base region of phototransistor 40.

During operation, phototransistor 40 amplifies the induced photocurrent. Light transmitted by waveguide core 32 is absorbed in base 38, creating electron-hole pairs. Collector 36 has a positive bias, and photogenerated electrons in base 38 are therefore swept into collector 36. As holes are generated in base 38, the electrons are prevented from traversing base 38 and entering emitter 34. These holes charge base 38 proximate emitter 34, thus lowering the emitter-base barrier, i.e. lowering the barrier for electron emission from emitter 34 into base 38. Phototransistor 40 is thereby switched on with a large current between emitter 34—collector 36, and the measured photocurrent is effectively amplified. The emitter 34/collector 36 current is equal to the induced photocurrent times the gain of phototransistor 40. The relatively small base 38 and emitter 34 sizes result in fast response times.

Figure 12B:
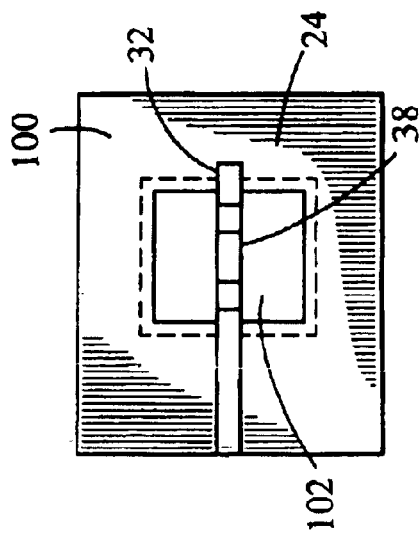
FIG. 12B is a top view of a photodiode and waveguide.
Figure 12A:
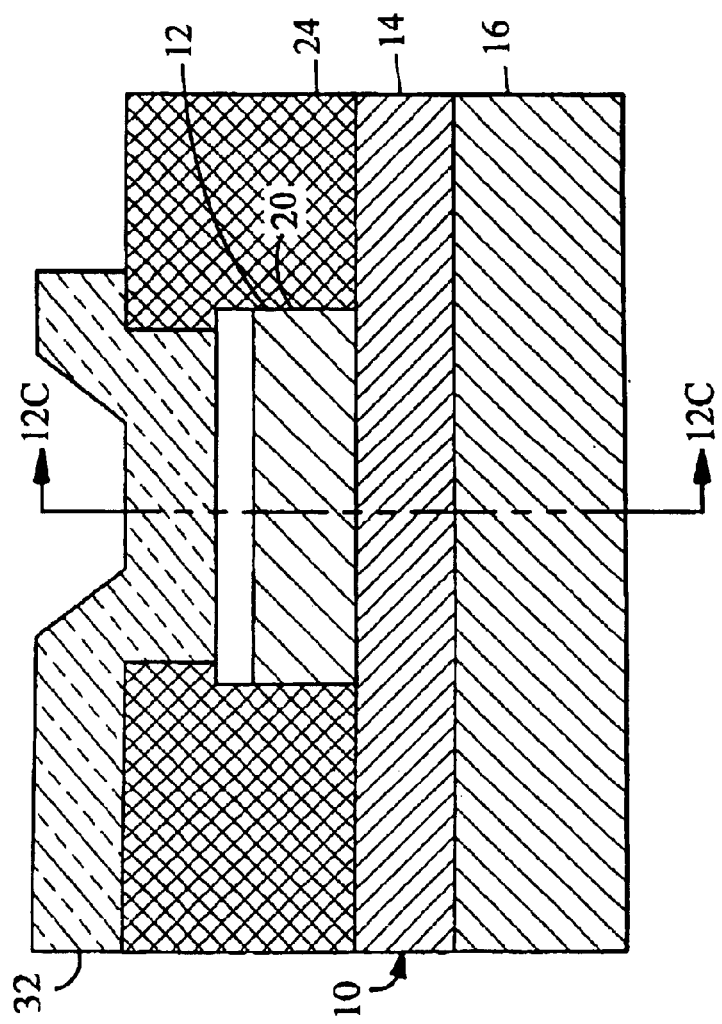
FIGS. 12A and 12C are cross-sectional views of a photodiode and waveguide.
Figure 12C:
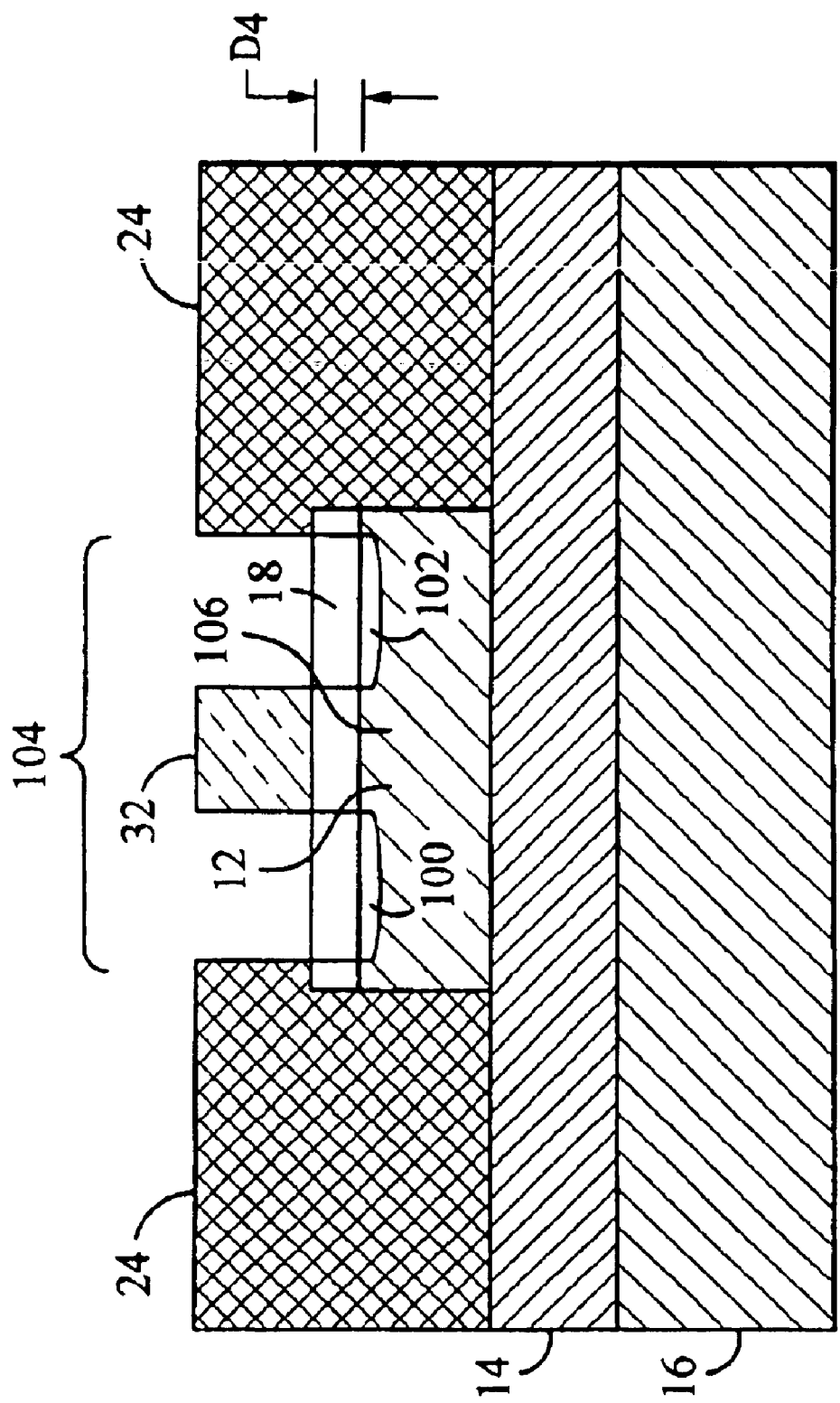

In an alternative embodiment, referring to cross-sectional side view in FIG. 12A, top view in FIG. 12B, and cross-sectional slice view in FIG. 12C, SOI substrate 10 is processed as described above with reference to FIGS. 1A–7B. In this embodiment, thin silicon layer 12 is intrinsic, undoped silicon. An n-type region 100 and a p-type region 102 are formed in thin silicon layer 12 proximate waveguide core 32. N-type region 100 and p-type region 102 are formed by an ion implantation by implanting through attenuating layer 18, using waveguide core 32 as a mask. Two separate photoresist masks (not shown) are used to separately define n-type region 100 and p-type region 102. To form n-type region 100, n-type ions are implanted, e.g., boron difluoride ($BF_2$), with a dose of $4 \times 10E14$ atoms/cm², and an energy of 30 keV. Also, p-type ions are implanted, e.g., phosphorus, with a dose of $4 \times 10E14$ atoms/cm², and an energy of 30 keV to form p-type region 102. Both n-type region 100 and p-type region 102 have a depth of $D_4$ of, e.g., 0.3 μm. A lateral p-i-n photodiode 104 is thereby formed, with n-type region 100, p-type region 102, and an intrinsic silicon region 106 between n-type region 100 and p-type region 102. SOI substrate 10 and lateral p-i-n photodiode 104 are processed further in the manner described with reference to FIGS. 9A–11B.

This application is not limited to the specific embodiments described above. For example, the buried silicon dioxide layer 14 can have a thickness of up to several microns. A portion of the attenuating layer 18 can be removed by wet etching. A photodevice can be fabricated without attenuating layer 18. Thin layer 12 can be a material other than silicon, such as such as germanium. The portions of the thin silicon layer 12 proximate the mesa region 20 can be left unetched. The intermediate cladding layer 24 can be thinner than the evanescent tail of a mode to be propagated through waveguide core 32. A portion of the cladding layer 24 can be removed by a wet etch, such as etching with hydrofluoric acid (HF) which etches oxides but does not attack germanium. Waveguide layer 28 can be a material other than silicon nitride, such as silicon oxynitride. The emitter 34 and collector 36 can be implanted by using a photoresist mask. The emitter 34 and collector 36 can be implanted with other types of n-type ions, such as arsenic, with a dose of $10E14$ atoms/cm², and an energy of 80–100 keV. Alternatively, with an n-type thin silicon layer 12, the emitter 34 and collector 36 can be formed by the implantation of p-type dopants. A single photoresist layer can be used to define n-type 100 and p-type 102 regions in lateral p-i-n diode 104, with the waveguide core 32 acting as a mask to protect intrinsic silicon region 106 from implantation. Top cladding layer 50 can be deposited by alternative deposition methods, such as by high-density plasma (HDP) deposition.

Other embodiments not described herein are also within the scope of the following claims.

What is claimed is:

1. A device, comprising:
   a waveguide core having a bottom surface and a top surface that defines a beveled mirror, the beveled mirror confining, within the waveguide core, reflections of a mode transmitted along the waveguide core;
   a cladding layer adjacent to the bottom surface, the cladding layer having a thickness equal to or greater than an evanescent tail of the mode
   a detector layer; and
   an attenuating layer coupled to the bottom surface of the waveguide core and positioned on top of the detector layer;
   wherein the beveled mirror directs the mode from within the waveguide core to the attenuating layer, the mode traveling through the attenuating layer and into the detector layer.

2. The device of claim 1, wherein the beveled mirror is at an angle relative to the waveguide core that is at least equal to an angle of total internal reflection of the waveguide core.

3. The device of claim 1, wherein the detector layer comprises a base of a phototransistor.

4. The device of claim 1, wherein the waveguide core is disposed over a substrate and the beveled mirror directs the mode, propagated through the waveguide core, through the detector layer into the substrate.

5. The device of claim 1, wherein the detector layer comprises an intrinsic layer region of a photodiode having an n-type region and a p-type region.

6. The device of claim 5, wherein the waveguide core is disposed over a substrate and the beveled mirror directs the mode, propagated through the waveguide core, through the detector layer into the substrate.

7. A device, comprising:
 a waveguide core having a bottom surface;
 a cladding layer adjacent to the bottom surface, the cladding layer having a thickness equal to or greater than an evanescent tail of a mode transmitted along the waveguide core;
 a detector layer;
 an attenuating layer coupled to the bottom surface of the waveguide core and positioned on top of the detector layer; and a beveled mirror disposed on the waveguide core, the beveled mirror confining reflections of the mode within the waveguide core, the beveled mirror directing the mode from within the waveguide core to the attenuating layer.

8. The device of claim 7, wherein the waveguide core has a top surface that defines an angle, the angle being at least equal to an angle of total internal reflection of the waveguide core.

9. The device of claim 7, wherein the beveled mirror is disposed at an angle.

10. The device of claim 7, wherein the detector layer comprises a base of a phototransistor.

11. The device of claim 7, wherein the waveguide core is disposed over a substrate and the beveled mirror directs the mode propagated through the waveguide core and through the detector layer into the substrate.

12. The device of claim 7, wherein the detector layer comprises an intrinsic layer region of a photodiode having an n-type region-and a p-type region.

13. The device of claim 12, wherein the waveguide core is disposed over a substrate and the beveled mirror directs the mode propagated through the waveguide core and through the detector layer into the substrate.

14. A device, comprising:
 a waveguide core having a bottom surface, the waveguide core for transmitting a mode;
 a cladding layer adjacent to the bottom surface;
 a detector layer;
 an attenuating layer coupled to the bottom surface of the waveguide core and positioned on top of the detector layer; and
 a beveled mirror disposed on the waveguide core, the beveled mirror confining reflections of the mode within the waveguide core, the beveled mirror directing the mode from within the waveguide core to the attenuating layer, the mode traveling through the attenuating layer into the detector layer.

15. The device of claim 14, wherein the waveguide core has a top surface that defines an angle, the angle being at least equal to an angle of total internal reflection of the waveguide core.

16. The device of claim 14, wherein the beveled mirror is disposed at an angle.

17. The device of claim 14, wherein the detector layer comprises a base of a phototransistor.

18. The device of claim 14, wherein the waveguide core is disposed over a substrate and the beveled mirror directs a mode propagated through the waveguide core through the detector layer into the substrate.

19. The device of claim 14, wherein the detector layer comprises an intrinsic layer region of a photodiode having an n-type region-and a p-type region.

20. The device of claim 19, wherein the waveguide core is disposed over a substrate and the beveled mirror directs a mode, propagated through the waveguide core, through the detector layer into the substrate.

21. The device of claim 14, wherein the cladding layer has a thickness equal to or greater than an evanescent tail of a mode to be transmitted along the waveguide core.

22. The device of claim 21, wherein the mode is transmitted along the waveguide core through the attenuating layer into the detector layer.

* * * * *